United States Patent [19]
Pal et al.

[11] Patent Number: 4,760,478
[45] Date of Patent: Jul. 26, 1988

[54] VISCO-ELASTICALLY DAMPED MAGNETIC HEAD SUSPENSION ASSEMBLY

[75] Inventors: George S. Pal, Saratoga; Charles G. Snyder, San Jose, both of Calif.

[73] Assignee: International Business Machines, Armonk, N.Y.

[21] Appl. No.: 883,201

[22] Filed: Jul. 8, 1986

Related U.S. Application Data

[63] Continuation of Ser. No. 480,997, Mar. 30, 1983, abandoned.

[51] Int. Cl.$^4$ .................. G11B 5/48; G11B 21/16
[52] U.S. Cl. ........................ 360/104; 360/97
[58] Field of Search ................ 360/102–106, 360/97–99, 75, 78

[56] References Cited

U.S. PATENT DOCUMENTS

| | | | |
|---|---|---|---|
| 3,725,884 | 4/1973 | Gartein | 340/174 |
| 4,189,759 | 2/1980 | Bauck et al. | 360/104 |
| 4,208,684 | 6/1980 | Janssen et al. | 360/104 |
| 4,216,505 | 8/1980 | Grant et al. | 360/104 |
| 4,389,688 | 6/1983 | Higashiyama | 360/104 |
| 4,399,476 | 7/1983 | King | 360/103 |
| 4,408,238 | 10/1983 | Hearn | 360/104 |
| 4,447,493 | 5/1984 | Driscoll et al. | 360/129 |

FOREIGN PATENT DOCUMENTS

| | | | |
|---|---|---|---|
| 0019554 | 2/1981 | Japan | 360/104 |
| 0117367 | 9/1981 | Japan | 360/104 |

OTHER PUBLICATIONS

Rynders et al., "Damped Slider Mount", IBM TDB, Aug. 1968, vol. 11, No. 3, p. 248.
Norwood, "Damped Head Arm", IBM TDB, Jan. 1979, vol. 21, No. 8, p. 3093.

*Primary Examiner*—Stuart N. Hecker
*Assistant Examiner*—David J. Severin
*Attorney, Agent, or Firm*—Otto Schmid, Jr.

[57] ABSTRACT

A magnetic head support arm for a disk file comprises a relatively rigid arm structure and a magnetic head suspension assembly fixed at one end to the head support arm having means on the other end to support a transducing head, and having a tapered elongated flat load beam connecting the ends. A means of damping the structure against vibrations comprises a layer of damping material fixed to the elongated flat load beam and a constraining member fixed in contact with the damping material so that the vibration energy is damped due to shear energy absorption in the layer of damping material.

7 Claims, 4 Drawing Sheets

VISCO-ELASTICALLY DAMPED MAGNETIC HEAD SUSPENSION ASSEMBLY

This is a continuation of application Ser. No. 06/480,997, filed Mar. 30, 1983, now abandoned.

BACKGROUND OF THE INVENTION

1. Field of the Invention

This invention relates to a magnetic head suspension assembly for supporting transducing heads in disk files.

2. Description of the Prior Art

One of the most common forms of information storage apparatus is the magnetic disk file in which information is written on and reproduced from the surface of a rotating storage disk by means of a transducing head. The use of a head arm assembly for supporting and positioning a magnetic head to access data from a track on a selected disk of the storage system is well known in the prior art. It is common to support the transducing head very close to the disk medium by means of an air bearing created by the motion of the disk. To access information on different areas of the disk, it is also well known to provide linear or rotary head positioning apparatus to move the heads over the disk surface to different radial positions. The head arm assemblies are mounted on the positioning apparatus in cantilever fashion, and the heads are mounted on the support arms by means of compliant suspensions which allow limited motion of the heads to accommodate irregularities in the disk surface or variations in the air bearing.

Vibration or resonance of the support arms can have a deleterious effect on the performance of the information storage apparatus. The introduction of damping to limit vibration in order to prevent the head from striking the disk is discussed in an article entitled "Damped Slider Mount" by R. R. Rynders et al (IBM Technical Disclosure Bulletin, Volume 11, No. 3, August 1968, page 248). A magnetic head, which is fixed rather than movable over a disk, is mounted on the tip of a cantilever support arm which is a sandwich structure of two metal members and a constrained elastometric damping layer.

In case of a movable head, it is well known to employ a closed loop servo system to control the positioning apparatus to position the head accurately over a desired concentric track of recorded information on the disk. Vibration of the head support arm can cause the head to move off track and introduce an error signal into the servo system which is modulated at the vibration frequency. Also, the resonant frequency of the head support arm is such as to cause instability of the servo system. Another effect of resonance of a head support arm is the degradation of the signal from the transducing head by modulation of the transduced signal. In the publication entitled "Damped Head Arm" by R. E. Norwood (IBM Technical Disclosure Bulletin, Volume 21, Number 8, January 1979, page 3093), the head arm is constructed of multilayers of metal with a viscous damping material sandwiched between the layers of the head arm to overcome both these problems in a flexible disk file.

Damping of head support arms employed in multiple disk files for similar reasons is described in U.S. Pat. No. 3,725,884 (I. B. Garfien). This patent shows a support arm on which a magnetic head is supported by a spring member and up and down motion of the magnetic head is damped by a further leaf spring in rubbing contact with friction pads.

Similar damping structure employed in multiple flexible disk files is described in U.S. Pat. Nos. 4,189,759 (R. C. Bauck et al) and 4,208,684 (D. M. Janssen et al). Both patents show an articulated support arm in which a base portion is hinged to a tip portion by a leaf spring. Up and down motion of the tip portion is damped by a further leaf spring in rubbing contact with friction pads.

Although the need for effective damping of magnetic head support apparatus has been recognized in the prior art, the various solutions have had a major impact on the structural design of the head support apparatus. In spite of those proposals, none of the methods of damping has been effective in reducing all modes of vibration to an acceptable level.

SUMMARY OF THE INVENTION

It is therefore the major object of this invention to provide damping means which is effective to substantially reduce the level of all modes of vibration while minimizing the impact on the overall design of the magnetic head support apparatus.

According to the present invention, there is provided a head support arm for a disk file adapted to support a transducing head at one end and adapted at the other end to be mounted on a positioning apparatus in cantilever fashion, the arm comprising a relatively rigid structure including a magnetic head suspension assembly fixed at one end to the head support arm, means on the other end to support a transducing head and comprising an elongated flat load beam connecting the ends, and damping means fixed to the load beam comprising a fixed layer of damping material and a constraining member in contact with the layer of damping material so that the amplitude of vibrations in the head suspension assembly is significantly reduced due to shear energy absorption damping in the layer of damping material.

By the use of the damping structure on the elongated flat area of the load beam, the damping structure is operable to reduce significantly vibration along the data tracks or tangential mode vibration, torsional mode vibration which produces off-track areas, as well as bending mode vibration which affects the flying height of the transducing head.

The preferred damping material is a viscoelastic damping polymer provided in the form of a pressure sensitive adhesive tape.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
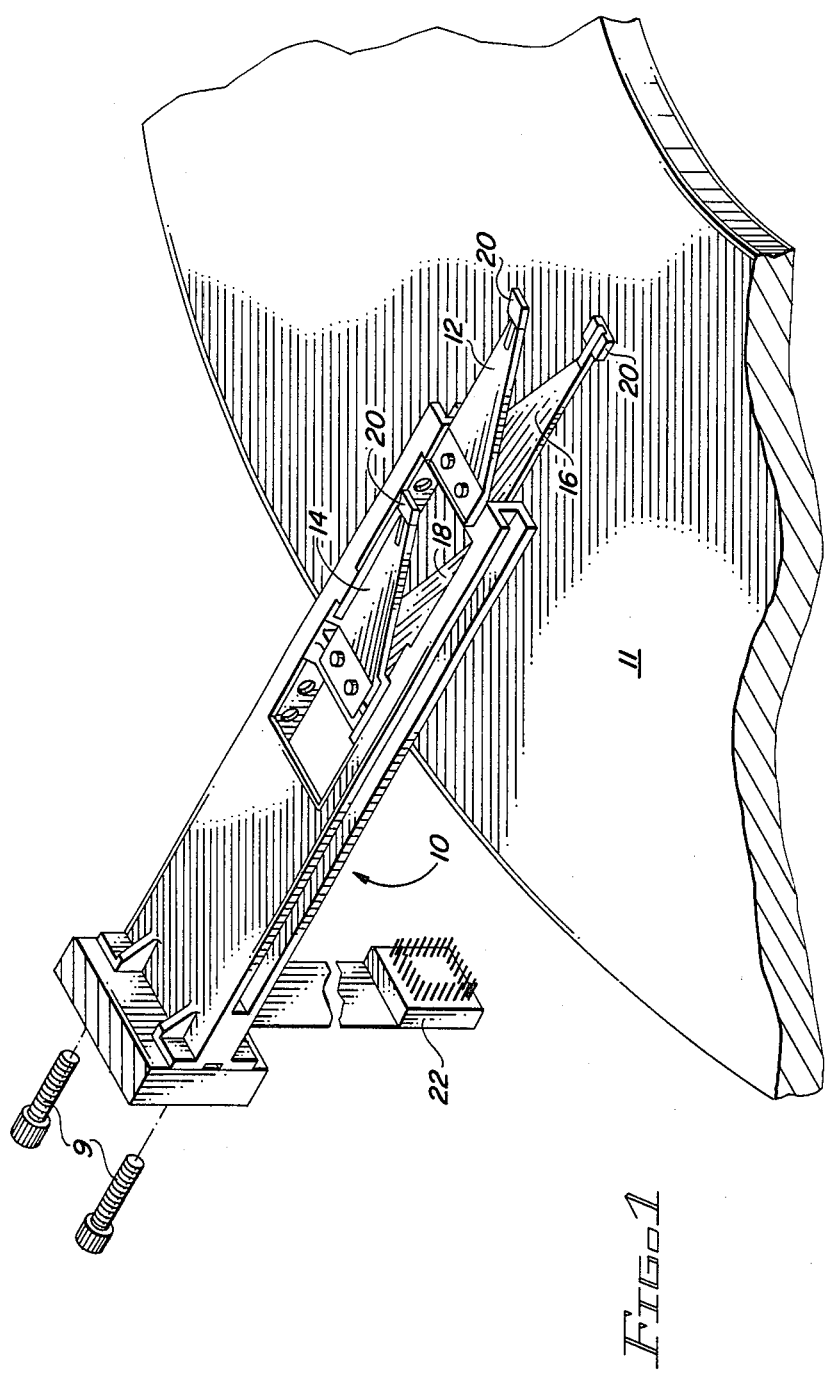
FIG. 1 is a perspective view of a magnetic head arm assembly.

With reference to FIG. 1, a magnetic head arm 10 is shown, and at least one magnetic head suspension assembly is attached to head arm 10. In the embodiment shown, magnetic head suspension assemblies 12 and 14 are attached to the top of the head arm, and magnetic head suspension assemblies 16 and 18 are attached to the bottom of the head arm 10. Each suspension assembly supports at its end a head slider 20, and each head slider 20 has one or more magnetic transducer means disposed so that the transducing gap may be in transducing relation with magnetic disk 11 surfaces only one of which is shown in the drawing. Electrical signals are conducted from the heads to a plug connector assembly 22 for use by the host system. Head arm 10 is attached by threaded screws 9, for example to suitable positioning means as is known in the art.

Figure 2:
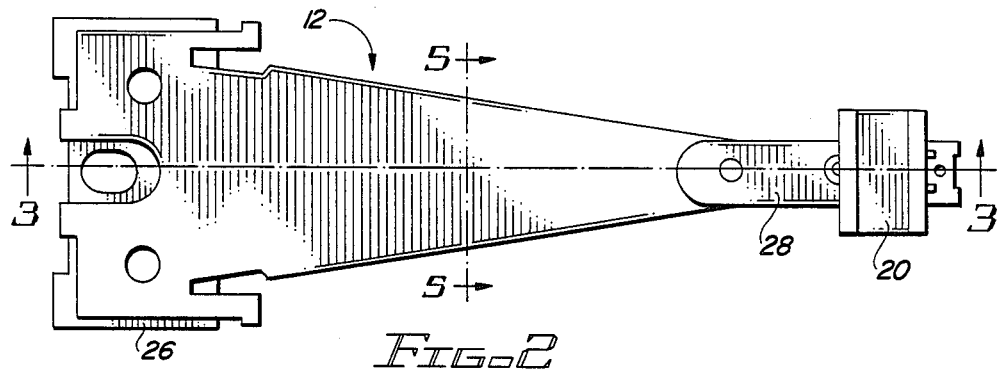
FIG. 2 is a top plan view of a magnetic head suspension embodying present invention.
Figure 3:
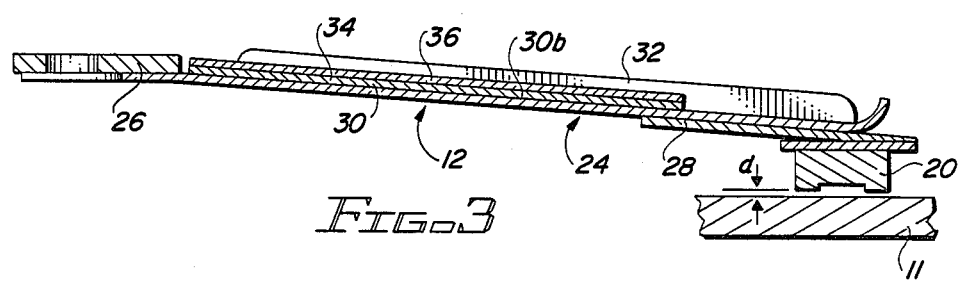
FIG. 3 is a longitudinal section view taken along lines 3—3 of FIG. 2.
Figure 4:
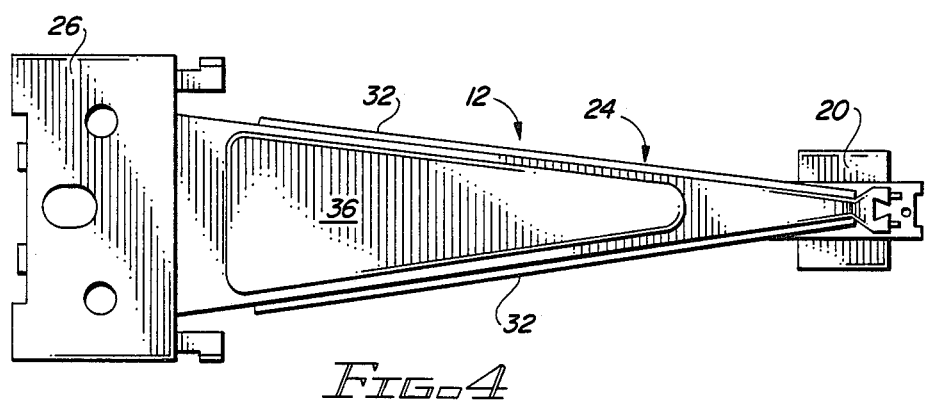
FIG. 4 is a bottom plan view of a magnetic head suspension embodying the present invention.

The structure of each of the suspensions 12, 14, 16, 18 is the same. The structure of suspension 12 is shown in FIG. 2 and this suspension comprises a load beam 24, a mounting block 26 and a flexure 28 to support head slider 20. The load beam 24 comprises a spring member having a tapered elongated flat section 30 having upturned edges to produce flanges 32 over part of its length to provide sufficient stiffness to load the magnetic head toward the disk 11 surface. An air bearing force supplied by the air flow adjacent to the disk 11 surface provides an opposing aerodynamic force or pressure to develop a spacing d (FIG. 3) between the head and the disk 11, or a flying height for the head, which may be about 20 microinches, by way of example. In this manner, a noncontact transducing relationship between the transducing gap of the magnetic heads and the data tracks of the magnetic disk 11 is established.

Figure 6:
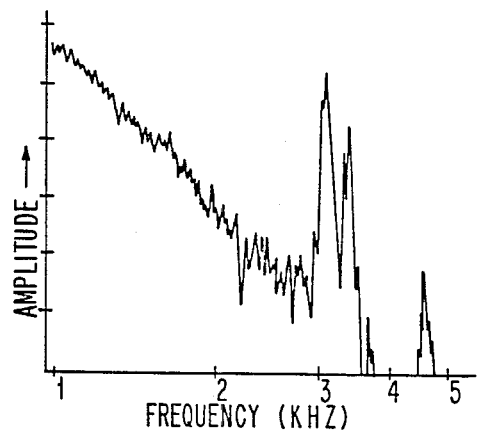
FIG. 6 is a graph of vibration amplitude versus frequency for a magnetic head suspension.

Although the head arm assembly described above achieves a desired head loading relative to a record surface, resonant frequencies are associated with the components of the assembly due to their design. Vibrations at one or more of these resonant frequencies tend to vary significantly the desired head-to-disk spacing, thereby degrading the read-write process. A graphical representation of the typical level of vibration at different frequencies for a specific suspension is shown in FIG. 6.

In accordance with the present invention, a damping element is positioned in intimate contact with the tapered elongated flat section of the load beam and a constraining member is fixed in position in intimate contact with the exposed side of the damping element. This structure significantly reduces the vibration by shear energy absorption damping in the damping element. The structure is operable to reduce tangential mode vibrations (along the data track), torsional mode vibration, and bending mode vibration.

In the specific embodiment shown in FIGS. 2-5, the damping element 34 substantially covers the surface 30b of the tapered elongated flat section 30. Surface 30b is the side of section 30 away from the disk 11 surface which is in transducing relation with the attached head slider 20. A constraining member 36 is fixed in intimate contact with the surface of damping element 34 so that damping element 34 is constrained between load beam 24 and constraining member 36.

Figure 7:
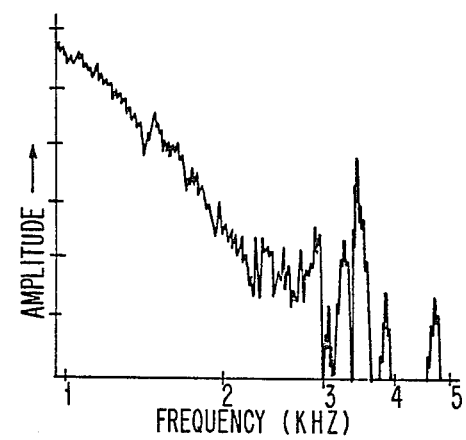
FIG. 7 is a graph of vibration amplitude versus frequency for the magnetic head suspension of FIG. 6 when modified in accordance with the embodiment of the present invention shown in FIG. 2.
Figure 10:
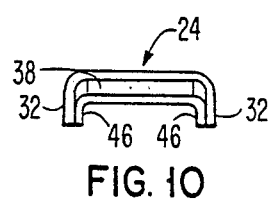
FIG. 10 is a section view taken along lines 10—10 of FIG. 8.

The addition of the damping control members to the magnetic head suspension reduces the vibration level by shear energy absorption damping in the damping element 34. The apparatus whose vibration characteristics were shown in FIG. 6 was modified by adding the damping control members as described above. The level of vibrations for the modified apparatus is shown in FIG. 7. Note that the damping was very effective between the 3.0 to 3.5 KHz frequency range in which the vibration level as shown in FIG. 6 exceeded the allowable vibration limits for a particular application. The level of vibration for the apparatus modified in accordance with the present invention (FIG. 7) was well within the specifications for that particular application.

Figure 5:
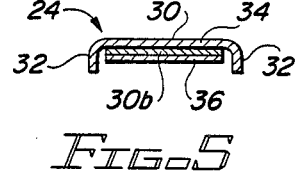
FIG. 5 is a section view taken along lines 5—5 of FIG. 2.

The damping member 34 may comprise any suitable viscoelastic material, and the damping member 34 may be held in intimate contact with the load beam surface 30b and constraining member 36 by any suitable means such as adhesives or mechanical means. One suitable material for damping member 34 is a modified acrylic polymer material, and such a material is produced in the convenient form of a double-sided tape by the 3M Company, St. Paul, Minn. under their designation ISD 110. The damping material 34 and constraining member 36 are cut to the proper shape and are stuck in position on surface 30b by the pressure sensitive nature of the tape as shown in FIG. 5. The load beam may then be heated to a temperature sufficient to tackify the viscoelastic material so that the three components are more effectively bonded together but not to a temperature which would destroy the viscoelastic properties of the polymer material. One suitable treatment comprises applying a pressure of from 15 to 30 psi in the presence of heat within the range of 200°-300° F. for about 45 seconds.

Figure 11:
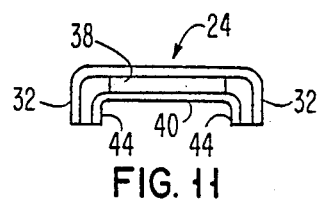
FIG. 11 is a section view taken along lines 11—11 of FIG. 8.
Figures 8, 9:
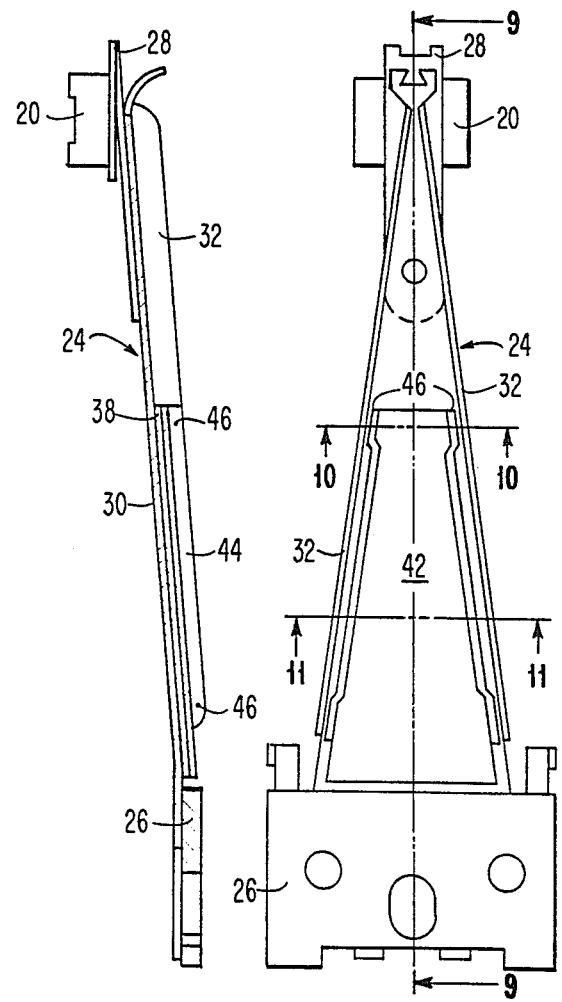
FIG. 8 is a bottom plan view of an alternate embodiment of a magnetic head suspension embodying the present invention.
FIG. 9 is a longitudinal section view taken along lines 9—9 of FIG. 8.

An alternate embodiment of the invention is shown in FIGS. 8-11 in which the damping element 38 is held in intimate contact with the surface 30b by a modified constraining member 40. The constraining member 40 has a flat section 42 which is coextensive with surface 30b and is provided with upturned edges to form flanges 44. As shown in FIG. 11, the distance between flanges 44 is less than the distance between flanges 32 so that a space is provided between flanges 32 and 44. However a tab 46 is provided at the end of each of the flanges 44 which is bent outward to extend to flanges 32. While in this position, the tab areas 46 are fixed, by welding, for example, to the flanges 32 so that the damping element 38 is held in intimate contact between load beam 24 and constraining member 40. Test data shows that this embodiment is also effective to substantially reduce the vibration amplitude over the frequency range shown in FIGS. 6 and 7.

The addition of the damping element and the constraining member to the suspension does not alter the fundamental design of the suspension, but these components are effective to substantially reduce the tangential mode vibration, the torsional mode vibration as well as the bending mode vibration.

The embodiments shown in FIGS. 2-5 and 8-11 are preferred since the damping elements are within the flanges 32 of the load beam and for that reason do not take up space in the suspension to disk area. However, the damping is equally effective when the damping element ad constraining member are fixed to the surface 30 of the load beam which faces the disk 11 surface which is in transducing relation with the attached head slider 20.

Figures 12, 13:
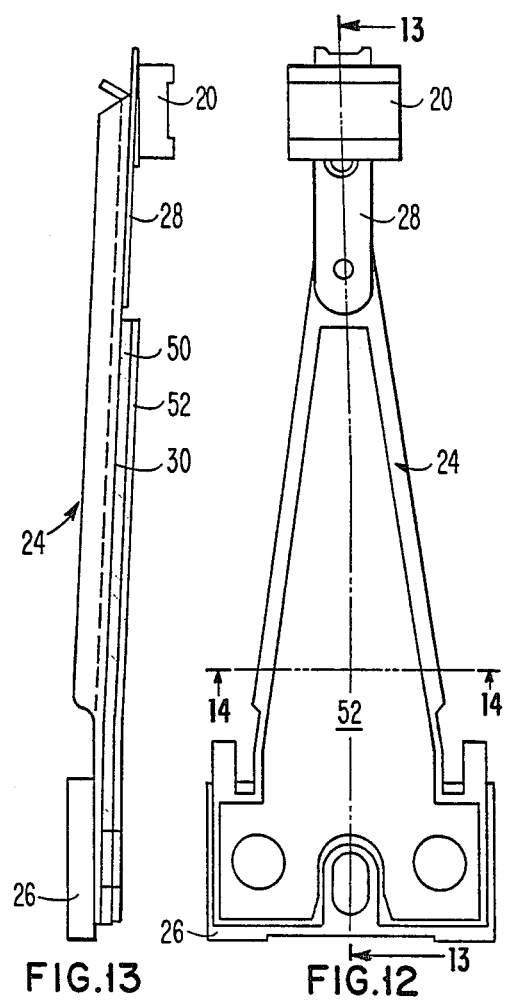
FIG. 12 is a top plan view of a further embodiment of magnetic head suspension embodying the present invention.
FIG. 13 is a longitudinal section view taken along lines 13—13 of FIG. 12.
Figure 15:
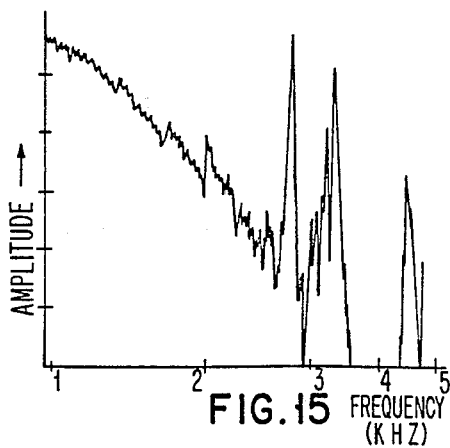
FIG. 15 is a graph of vibration amplitude vs. frequency for a magnetic head suspension.

The embodiment shown in FIG. 12 comprises a load beam 24 having in intimate contact with its surface 30 a damping element 50. A constraining member 52 is positioned in contact with damping element 50 so that vibrations are damped by shear energy absorption in damping element 50 due to differential movements of load beam 24 and constraining member 52 due to the vibrations. FIGS. 15 (before) and 16 (after) show the effect produced on the vibration amplitude by the addition of the damping apparatus described to the magnetic head suspension.

Figure 14:
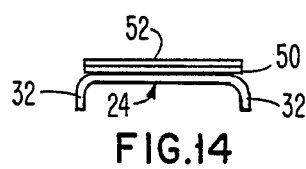
FIG. 14 is a section view taken along lines 14—14 of FIG. 12.

The damping element and the constraining member may be fixed in position by suitable adhesives or by mechanical means. The embodiment shown in FIGS. 12-14 can be fixed in position by the use of a pressure sensitive tape and selective heating as was previously described with respect to the embodiment shown in FIGS. 2-5.

Figure 17:
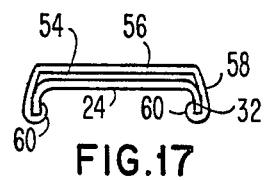
FIG. 17 is a section view of another embodiment of the magnetic head suspension embodying the present invention.

The damping structure can also be fixed in place by mechanical means. One suitable embodiment is shown in FIG. 17. In this embodiment, the constraining member 56 has turned edges to produce flanges 58 which mate with flanges 32 of load beam 24. A plurality of spaced tabs are produced on flanges 58 so that the tabs 60 can be bent inward around flanges 32 to fix damping element 54 and constraining member 56 in place. Alternatively damping element 54 may extend to the edges of the flanges 58 and either flanges 58 or both flanges 58 and 32 may be rolled over to fix the damping element in position. These embodiments also substantially reduce the vibration amplitude over the frequency range of interest.

Figure 16:
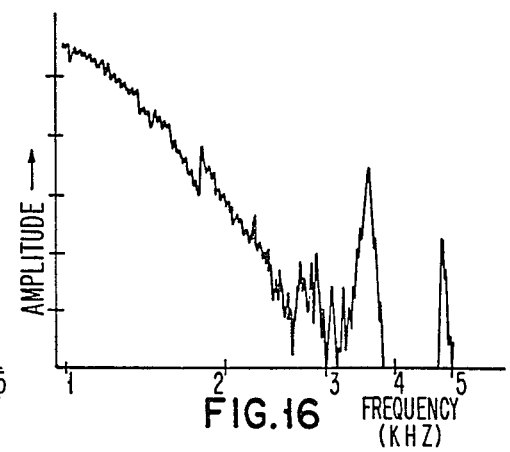
FIG. 16 is a graph of vibration amplitude vs. frequency for the magnetic head suspension of FIG. 15 is modified in accordance with the embodiment of the present invention shown in FIG. 12.

In a specific embodiment which gave damping improvement similar to that shown in FIGS. 7 and 16, the load beam 24 was made of stainless steel 3 mils thick, the viscoelastic damping material was 5 mils thick, and the constraining member 36 was made of stainless steel 2 mils thick.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A head support arm for a disk file adapted to support a transducing head at one end closely adjacent to a planar recording disk and adapted at the other end to be mounted on a positioning apparatus in cantilever fashion, the arm comprising a relatively rigid structure, the improvement comprising:

a resilient magnetic head suspension assembly fixed at one end to said head support arm having means on the other end to support a transducing head and comprising an elongated flat load beam connecting said one and said other end, said load beam compressing two major surface areas extending in a plane substantially parallel to said head support arm;

a layer of damping material fixed to substantially cover one of said major surface areas of said load beam; and a relatively thin constraining member fixed in contact with substantially the entire area of said layer of damping material but substantially mechanically isolated from said load beam so that the amplitude of vibrations in said head suspension assembly is significantly reduced due to shear energy absorption damping in said layer of damping material whereby, when said transducing head is positioned closely adjacent to a moving planar recording disk, the spacing between said transducing head and said planar recording disk is maintained at a predetermined spacing.

2. The head support arm of claim 1 wherein said elongated flat load beam has flanges along its edges.

3. The head support arm of claim 2 wherein said layer of damping material is fixed between said flanges.

4. The head support arm of claim 2 wherein said layer of damping material is fixed on the surface of said elongated flat load beam opposite to said flanges.

5. The head support arm of claim 1 wherein said layer of damping material comprises a strip of pressure sensitive adhesive tape.

6. The head support arm of claim 5 wherein said pressure sensitive adhesive tape consists of a viscoelastic damping polymer.

7. The head support arm of claim 5 wherein both said load beam and said constraining member are made of stainless steel.

* * * * *

UNITED STATES PATENT AND TRADEMARK OFFICE
CERTIFICATE OF CORRECTION

PATENT NO. : 4,760,478
DATED : July 26, 1988
INVENTOR(S) : George S. Pal et al

It is certified that error appears in the above-identified patent and that said Letters Patent are hereby corrected as shown below:

IN THE CLAIMS

Column 6, lines 25-26, after "said load beam", delete "compressing" and insert -- comprising --.

Signed and Sealed this

Twenty-ninth Day of November, 1988

Attest:

DONALD J. QUIGG

Attesting Officer

Commissioner of Patents and Trademarks